INVENTORS
JEROME M. IDELSOHN
JOHN L. McKELVIE
BY RALPH W. ROTHFUSZ
ALLEN E. YOUNG
Richard T. Seeger
ATTORNEY

FIG. 2

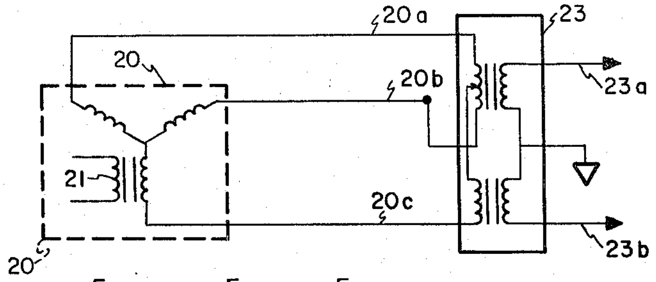

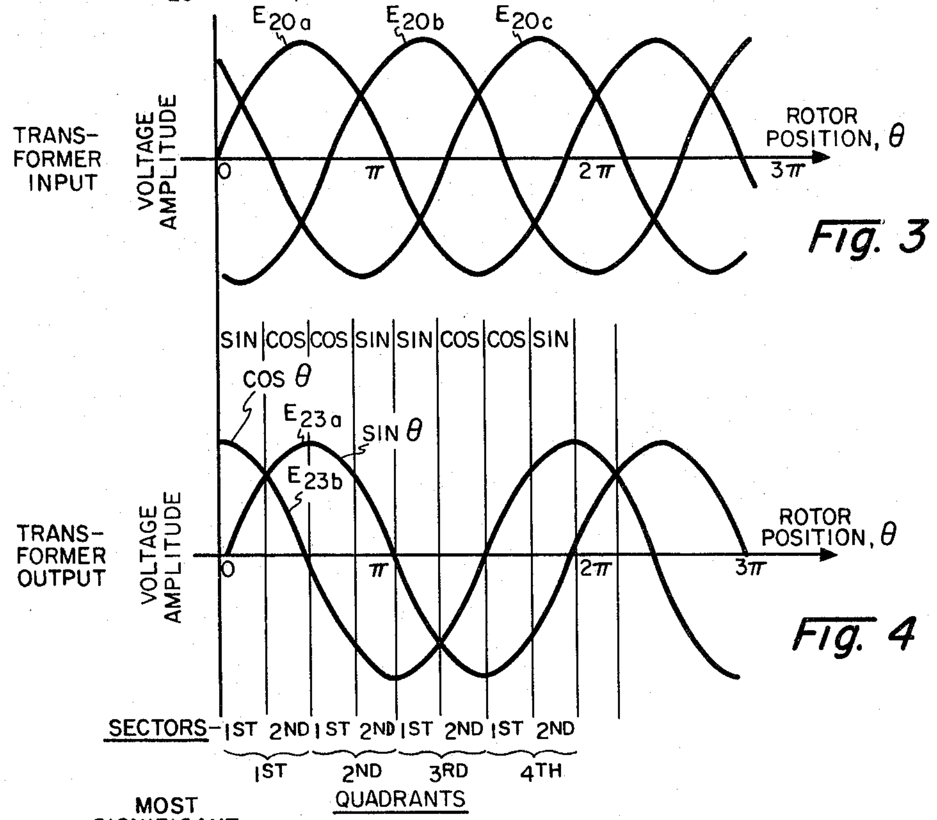
FIG. 3, FIG. 4

FIG. 4a

| | MOST SIGNIFICANT BIT | 2ND | 3RD | SMALLER ABSOLUTE VALUE | COMPLEMENT INSTRUCTIONS |
|---|---|---|---|---|---|
| 1ST QUADRANT 1ST SECTOR | 0 | 0 | 0 | SIN θ | NO |
| 1ST QUADRANT 2ND SECTOR | 0 | 0 | 1 | COS θ | YES |
| 2ND QUADRANT 1ST SECTOR | 0 | 1 | 0 | COS θ | NO |
| 2ND QUADRANT 2ND SECTOR | 0 | 1 | 1 | SIN θ | YES |
| 3RD QUADRANT 1ST SECTOR | 1 | 0 | 0 | SIN θ | NO |
| 3RD QUADRANT 2ND SECTOR | 1 | 0 | 1 | COS θ | YES |
| 4TH QUADRANT 1ST SECTOR | 1 | 1 | 0 | COS θ | NO |
| 4TH QUADRANT 2ND SECTOR | 1 | 1 | 1 | SIN θ | YES |

INVENTORS
JEROME M. IDELSOHN
JOHN L. McKELVIE
RALPH W. ROTHFUSZ
ALLEN E. YOUNG
BY Richard T. Seeger
ATTORNEY

*INVENTORS*
JEROME M. IDELSOHN
JOHN L. McKELVIE
RALPH W. ROTHFUSZ
ALLEN E. YOUNG
BY
Richard T. Seeger
ATTORNEY

DECODE MATRIX

INVENTORS
JEROME M. IDELSOHN
JOHN L. McKELVIE
RALPH W. ROTHFUSZ
ALLEN E. YOUNG
BY
Richard I. Seeger
ATTORNEY INVENTORS
JEROME M. IDELSOHN
JOHN L. McKELVIE
RALPH W. ROTHFUSZ
ALLEN E. YOUNG
BY
Richard T. Seeger
ATTORNEY INVENTORS
JEROME M. IDELSOHN
JOHN L. McKELVIE
BY RALPH W. ROTHFUSZ
ALLEN E. YOUNG
Richard T. Seeger
ATTORNEY INVENTORS
JEROME M. IDELSOHN
JOHN L. McKELVIE
RALPH W. ROTHFUSZ
ALLEN E. YOUNG
BY
Richard J. Seeger
ATTORNEY INVENTORS
JEROME M. IDELSOHN
JOHN L. McKELVIE
BY RALPH W. ROTHFUSZ
ALLEN E. YOUNG
Richard T. Seeger
ATTORNEY Dec. 27, 1966 J. M. IDELSOHN ETAL 3,295,125

DEVICE FOR DIGITAL REPRESENTATION OF AND CONVERSION TO A SYNCHRO DEVICE ROTOR POSITION

Filed May 1, 1963 10 Sheets-Sheet 9

INVENTORS
JEROME M. IDELSOHN
JOHN L. McKELVIE
RALPH W. ROTHFUSZ
ALLEN E. YOUNG

BY Richard T. Seeger
ATTORNEY

INVENTORS
JEROME M. IDELSOHN
JOHN L. McKELVIE
BY RALPH W. ROTHFUSZ
ALLEN E. YOUNG
Richard J. Seeger
ATTORNEY United States Patent Office 3,295,125

Patented Dec. 27, 1966

3,295,125

DEVICE FOR DIGITAL REPRESENTATION OF AND CONVERSION TO A SYNCHRO DEVICE ROTOR POSITION

Jerome M. Idelsohn, Huntington Woods, John L. McKelvie, Royal Oak, Ralph W. Rothfusz, Southfield, and Allen E. Young, Farmington, Mich., assignors to The Bendix Corporation, Southfield, Mich., a corporation of Delaware Filed May 1, 1963, Ser. No. 277,324
17 Claims. (Cl. 340—347)

This invention pertains to a synchro device rotor position-to-digital converter which converts the rotor position of a synchro device to a binary digital number for use in a digital computer. This invention also provides for the conversion of a binary digital number to a three-wire signal to position the rotor of a synchro device. Synchro as used here defines a rotating device which is supplied with single-phase power and has an output depending on the position of the synchro rotor.

It is an essential object of this invention to perform the "synchro-to-digital" conversion by first obtaining A.C. voltage analogs of the sine and cosine of the rotor angle from the three-wire signal from the synchro device to define the rotor angle.

It is an object of this invention to obtain said A.C. voltage analogs of the sine and cosine of the rotor angle by introducing the three-wire synchro signal into one side of a Scott-connected transformer, which signals will be converted by the transformer to develop the voltage analogs of the sine and cosine of the angle at the other side of the transformer.

It is a further object of this invention to transform the binary digital number in the output regsiter by means of a non-linear digital-to-analog converter to a D.C. voltage analog of the sine of the number in the output register and compare this with the D.C. voltage analog of the sine of the rotor angle and then by means of successive approximations make the number in the register correct so that its sine will equal the sine of the rotor angle and hence the register number will equal the rotor angle.

It is a further object of this invention to average the A.C. voltage amplitude analogs of the sine and cosine of the angle over a portion of a cycle to eliminate the effect of harmonics and quadrature signals, and to reduce the effect of random noise. For example, if the portion is selected as one-third of a cycle the effect of the third harmonic component, which is the most prevalent harmonic occurring in such synchro device, is eliminated. Further, if the averaging period is centered about the 90° or quadrature point of the synchro signal fundamental frequency, then the effect of quadrature frequency components is eliminated. In general effects of all frequency components having an integral member of cycles in the selected period are eliminated.

A still further object is to provide for the conversion of a binary digital number to a three-wire signal to position the rotor of a synchro device by converting the binary number on a first register to A.C. voltage amplitude analogs of the sine and alternately the cosine of the number by means of a complementing register and a non-linear digital-to-analog converter.

Another object is to employ hold circuits, in the device of the previous object, one for receiving only the sine D.C. analog signal and one for receiving only the cosine D.C. analog signal and then modulating these D.C. analog outputs to produce an A.C. analog output. A means for inverting the phase of the modulated signals is provided to cause the phase relationships for the different quadrants to be correct.

A further object is to provide a second register, in the device of the previous object, which adds angle increments to the first register at a higher rate than that with which the first register is fed by the input computer; the second register is also fed periodically by the input computer and this information is applied at a high rate and in equal increments for a given period to the first register. This greatly relieves the demands on the input computer.

These and other objects will become more apparent when this invention is considered in connection with the drawings in which:

FIGURE 2 is a schematic diagram of the transformer used to obtain the A.C. voltage amplitude analogs of the sine and cosine of the synchro rotor angle;

FIGURE 3 is a voltage amplitude versus rotor position diagram representing the input to the transformer of FIGURE 2;

Figure 1:
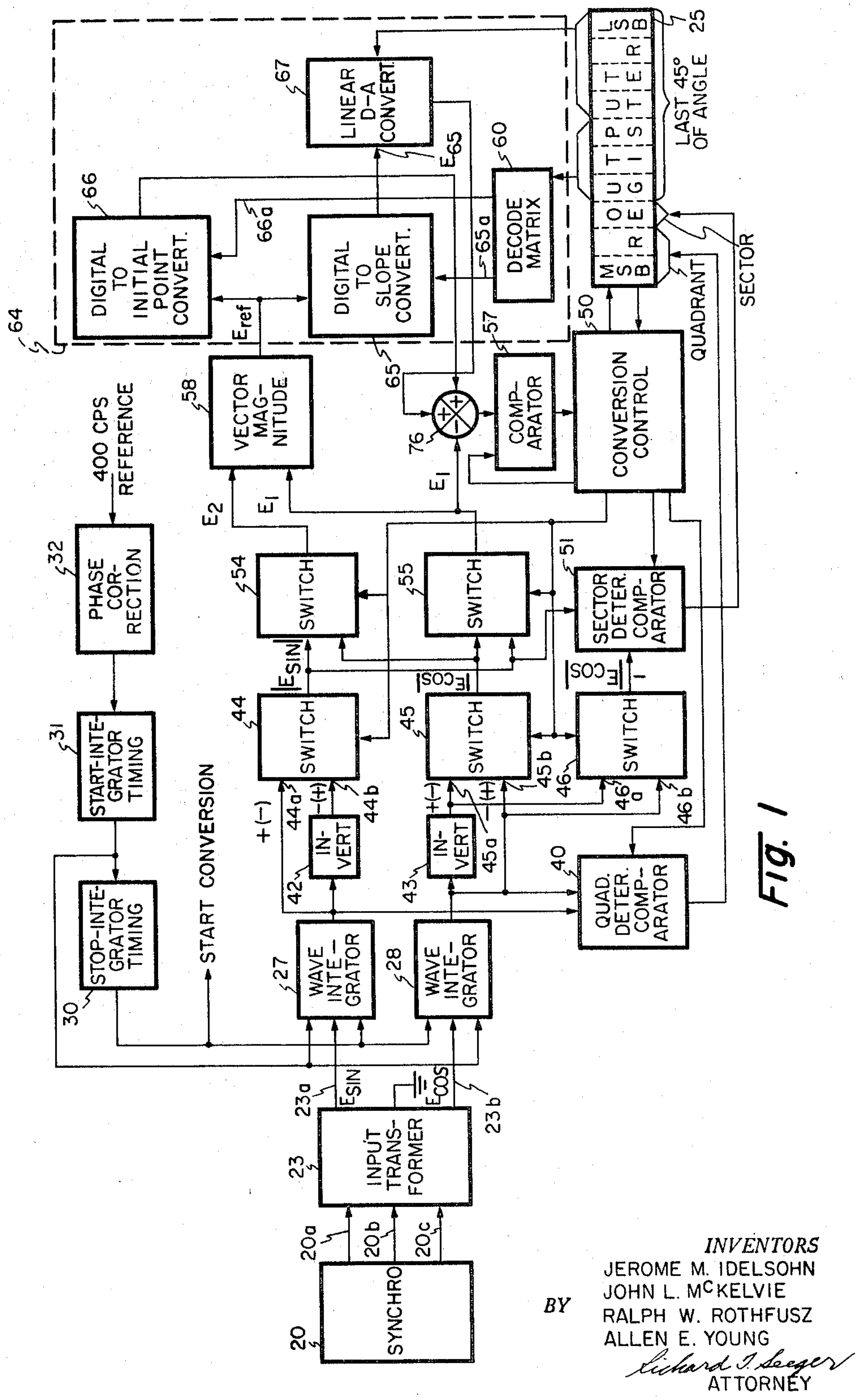
FIGURE 1 is a block diagram of the synchro-to-digital converter circuit.
Figure 4B:
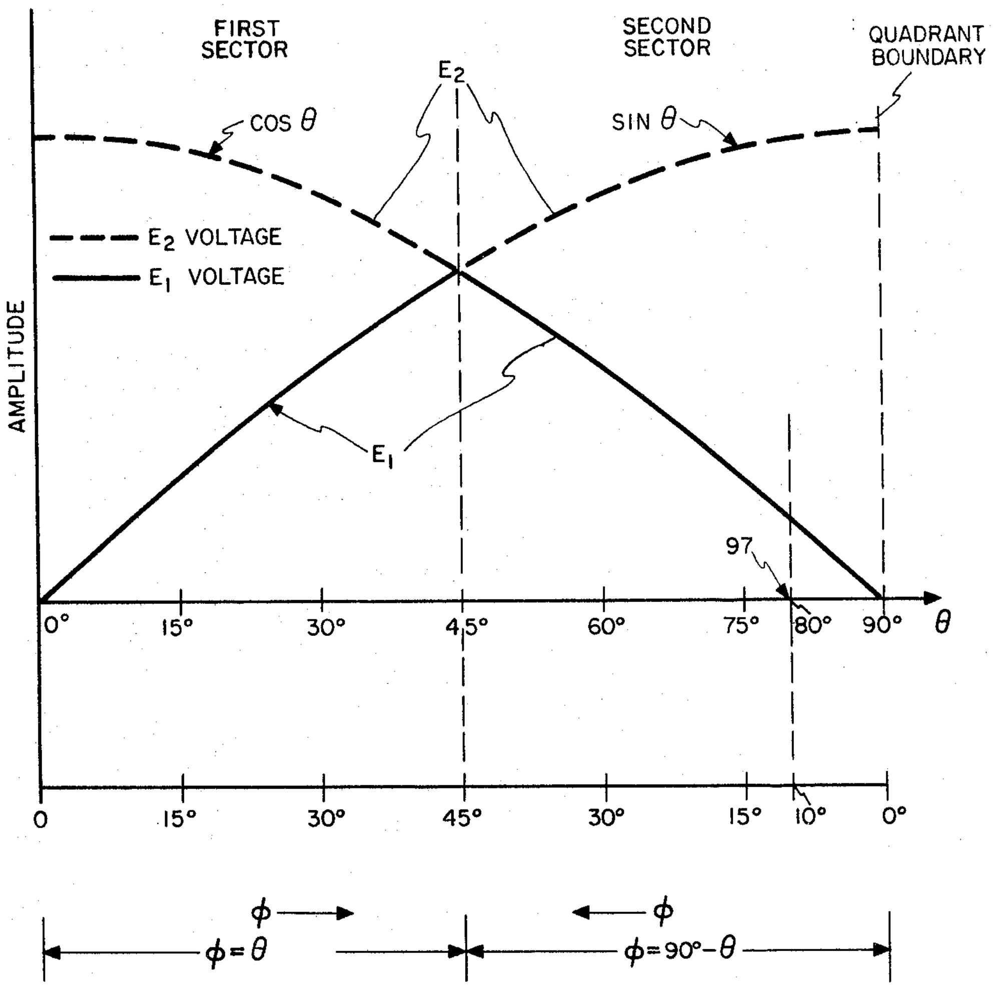
FIGURE 4 is a voltage amplitude versus rotor position digram representing the output of the transformer of FIGURE 2.
Figure 4C:
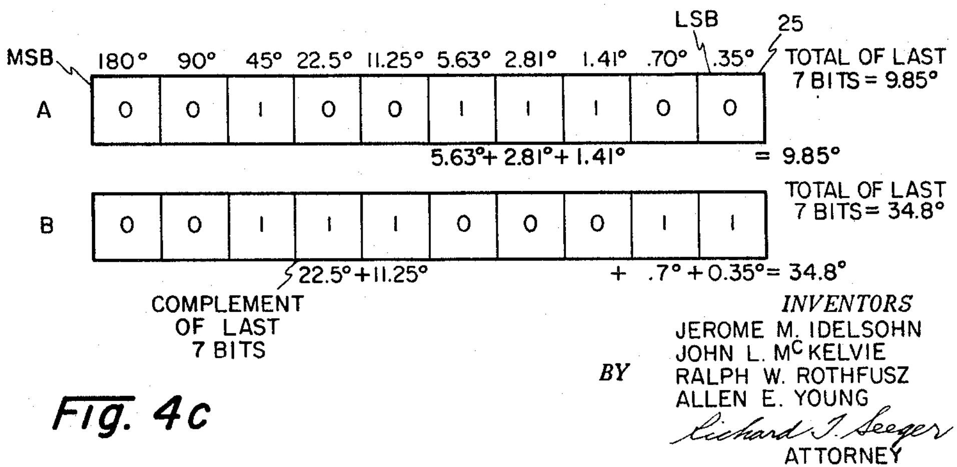
Figure 5:
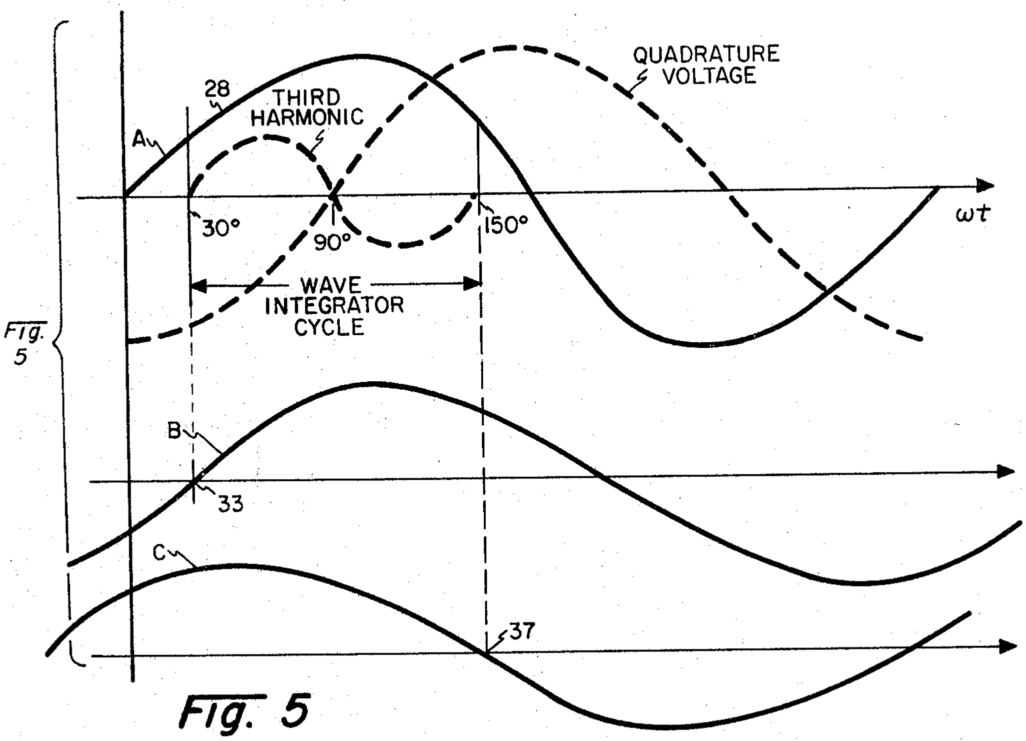
Figure 8:
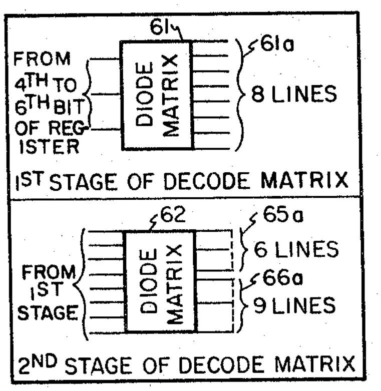
Figure 6:
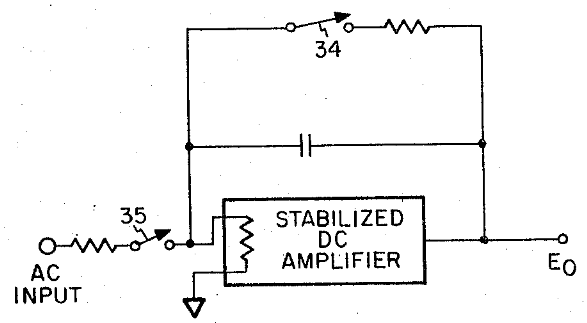
Figure 7:
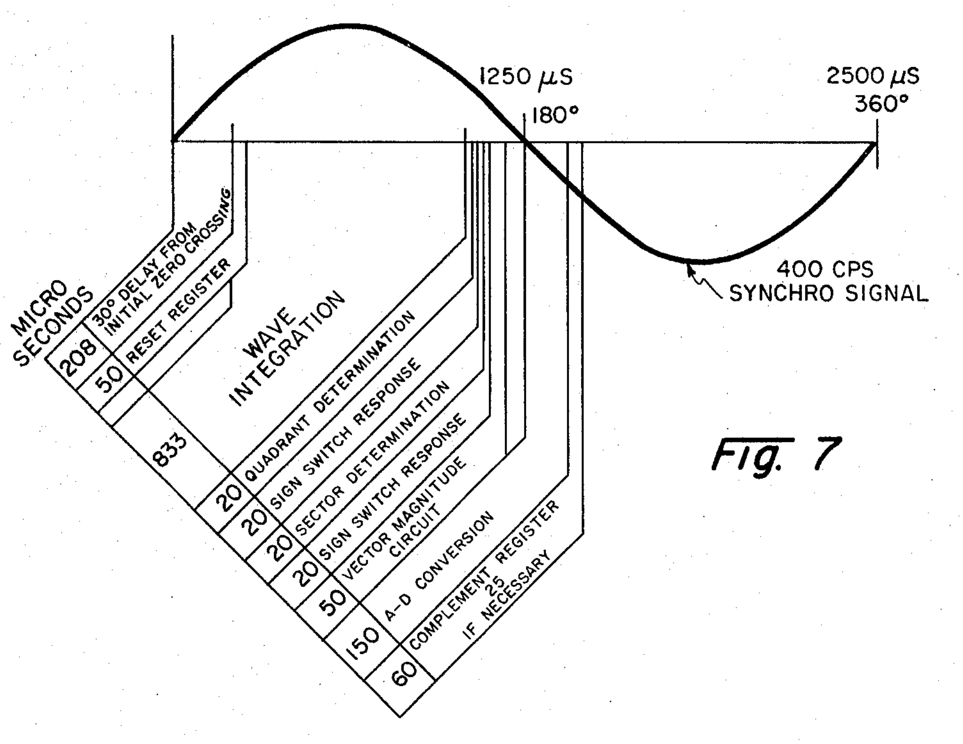
Figure 11:
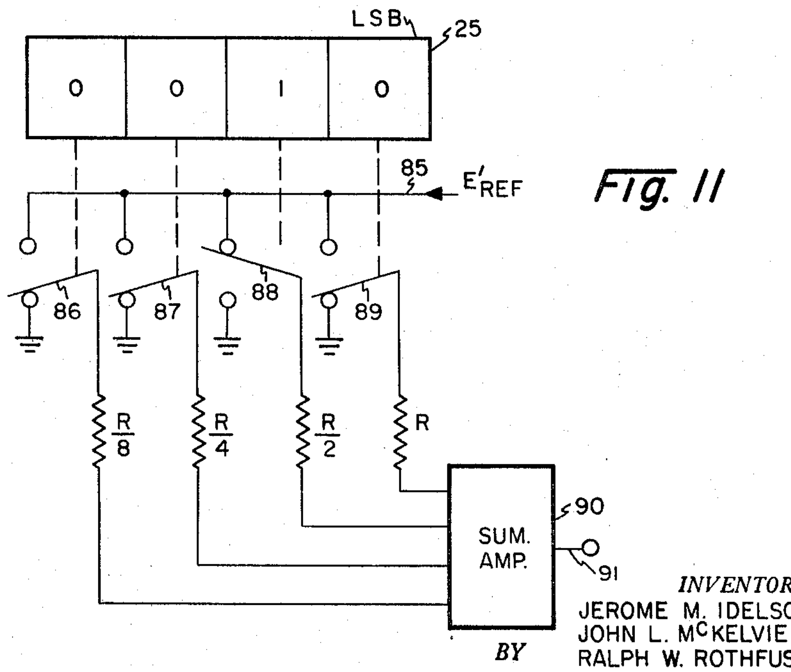
Figure 9:
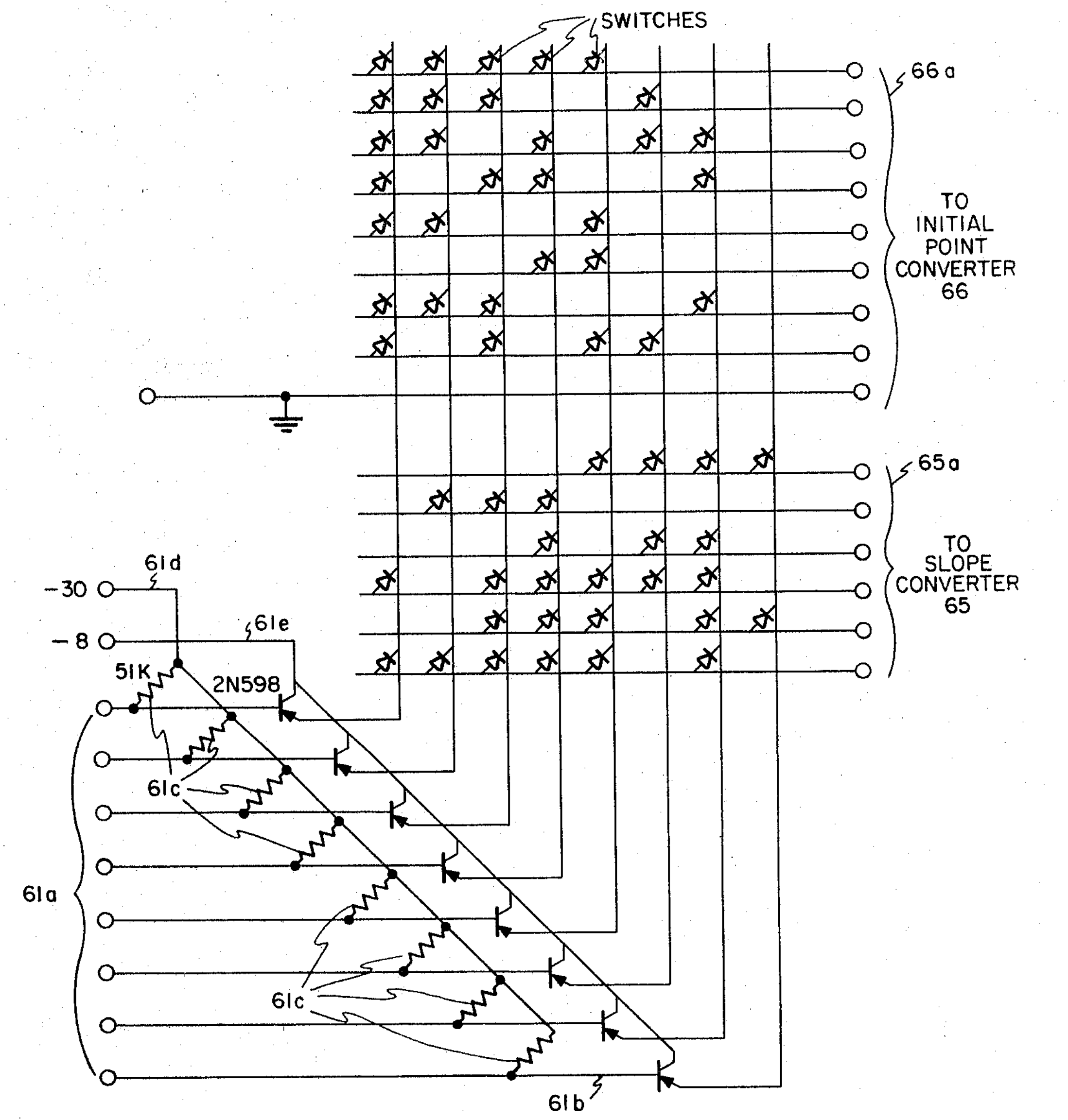
Figure 10:
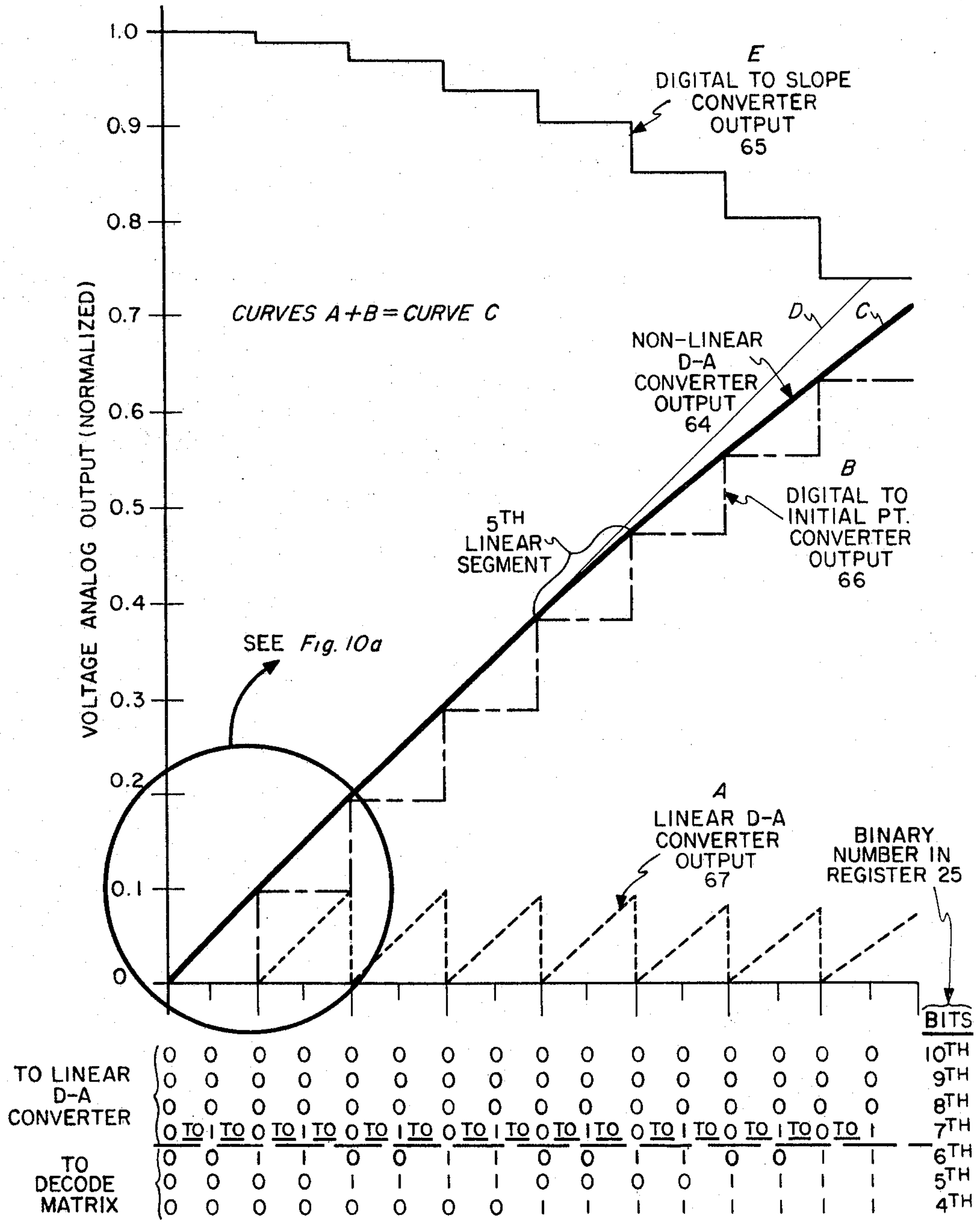
Figure 10A:
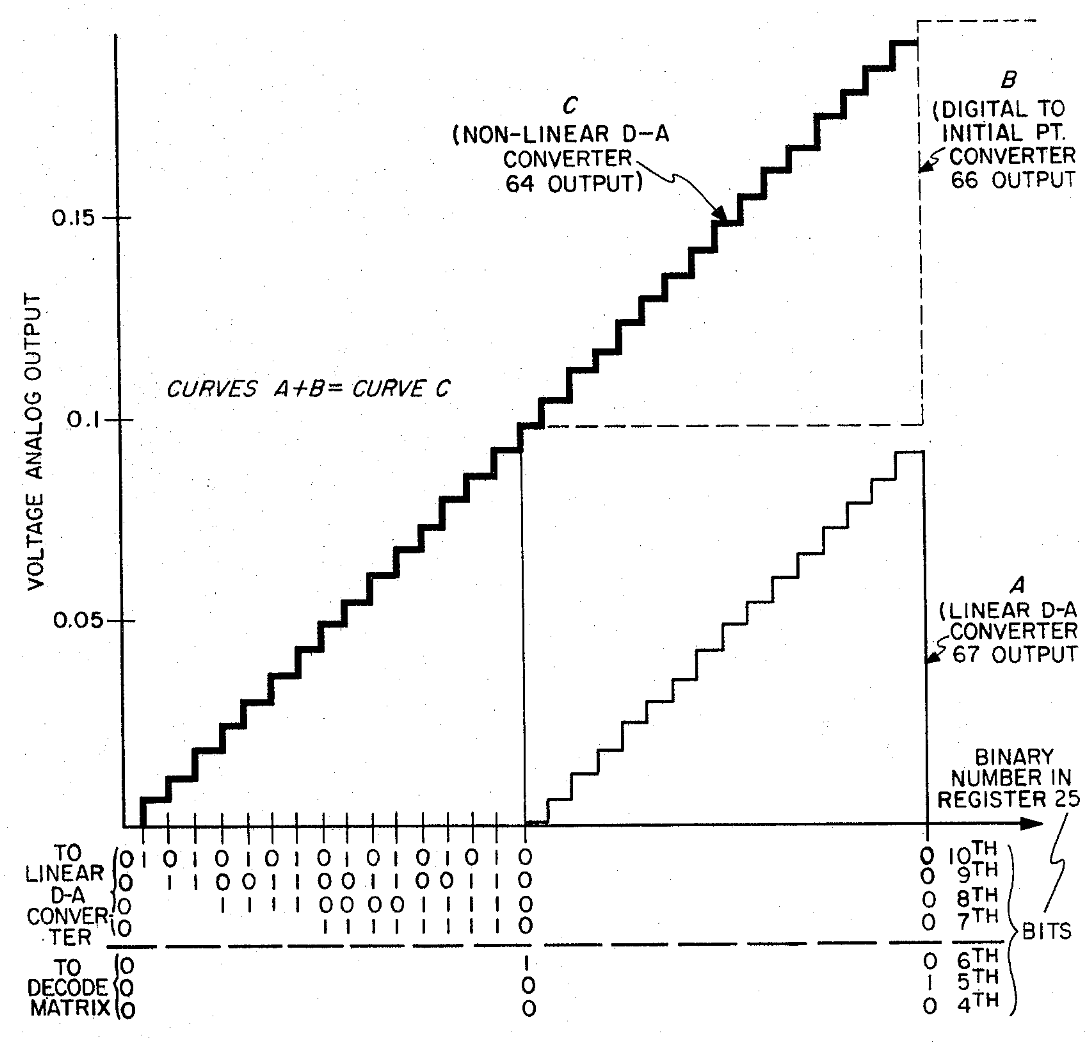
Figure 12:
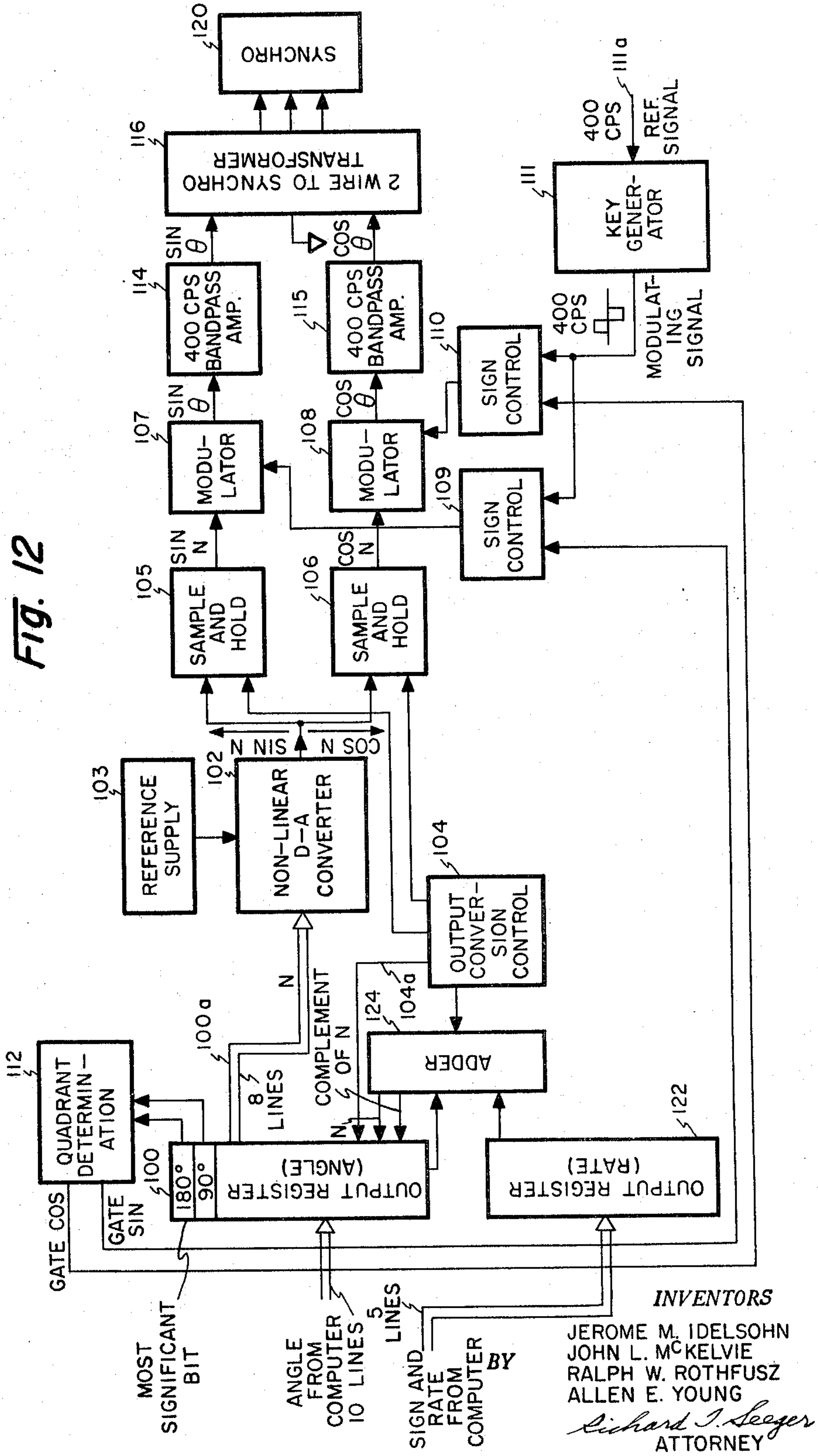
Figure 13:
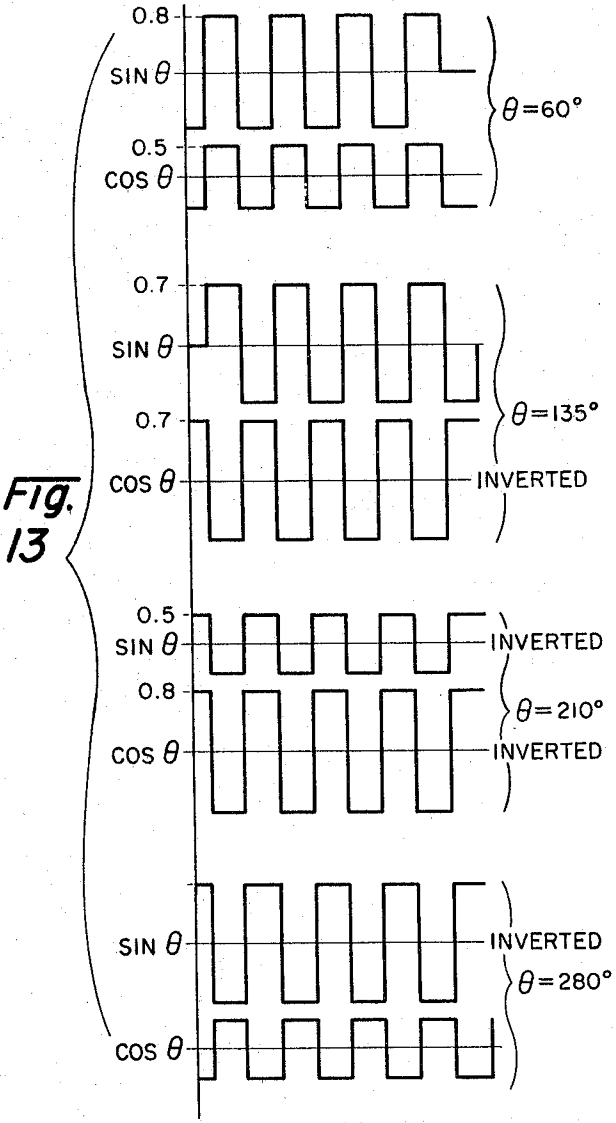
Figure 14:
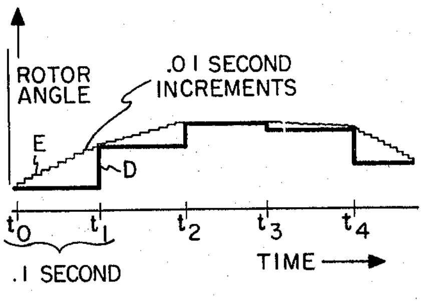
Figure 15:
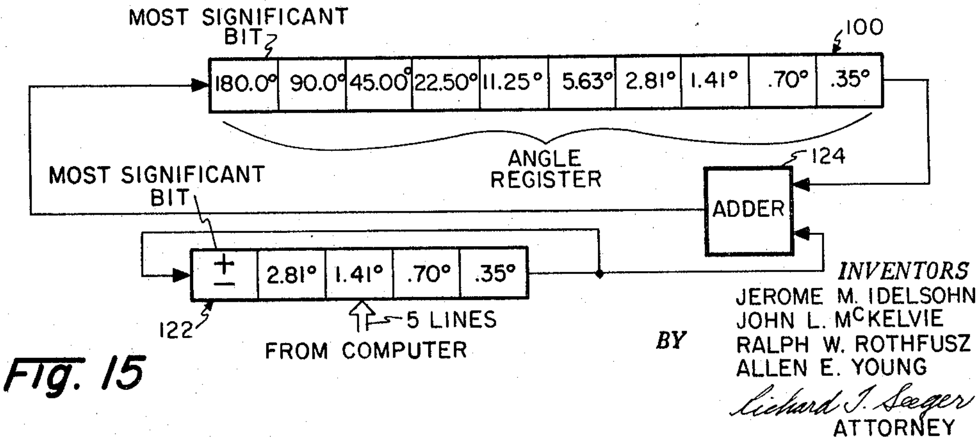

FIGURE 4*a* is a chart showing the relationships of the transformer output voltages corresponding to the sector in which they appear, with the sector representation by the three most significant bits in the output register also being shown;

FIGURE 4*b* shows the relationship between the angle measurements as they are made in the first and second sector of a quadrant;

FIGURE 4*c* is an illustration of the output register complementing process;

FIGURE 5 shows three waveforms A, B and C with waveform A representing the waveform upon which measurements are made, waveform B indicates the waveform used for starting the integration and waveform C indicates the waveform used for terminating the integration;

FIGURE 6 is a schematic diagram of the integrator used in this invention and in the circuit diagram of FIGURE 1;

FIGURE 7 is the timing diagram indicating the sequence of operation of the various elements in FIGURE 1;

FIGURE 8 shows simplified schematic diagrams of the first and second stages of the Decode Matrix;

FIGURE 9 is a schematic diagram in more detail of the second stage of the Decode Matrix;

FIGURE 10 is a graph showing the relationship between the non-linear digital-to-analog converter output and the digital register contents;

FIGURE 10*a* shows more detail of a portion of FIGURE 10;

FIGURE 11 is a simplified schematic diagram of a linear converter used in the block diagram of FIGURE 1;

FIGURE 12 is a block diagram of the Digital-to-Synchro Device Rotor position converter;

FIGURE 13 is a series of graphs showing the phase relationships of the modulated sine and cosine signals in the block diagram of FIGURE 12;

FIGURE 14 is a graph showing the manner in which the rate register in the embodiment of FIGURE 12 makes the output curve more gradual; and FIGURE 15 is an enlarged simplified schematic diagram showing the rate register, angle register, and adder of the embodiment in FIGURE 12, with the bit weights being shown in the registers.

Before discussing the schematic diagrams in the FIGURES 1–11, it is believed helpful to use equations to see generally what is taking place and what transformations of the incoming analog signal are occurring as the digital number is obtained.

A three-wire voltage is received from a synchro device 20, FIGURE 2, which indicates the position of the synchro device rotor 21. Each rotor position will deliver corresponding voltages through the three wires 20*a*, 20*b* and 20*c* to a Scott-connected transformer 23 which is a transformer well known to the art and may be found in reference #1. (Throughout this specification, references will be made for certain of the components of this invention which are well known to the art. These references describe the components in detail and may be found in a list at the end of this specification.) The two-wire outputs 23*a* and 23*b* from the Scott-connected transformer carry the following signals:

$$E_{\sin}=E_{\text{rotor}} \sin \theta \text{ (output wire 23a)}$$
$$E_{\cos}=E_{\text{rotor}} \cos \theta \text{ (output wire 23b)}$$

(where $E_{\text{rotor}}$ is an A.C. voltage, i.e., $$E_{\text{rotor}}=E \sin \omega_c t$$

where $E$ is the amplitude and $\omega_c$ is the radian frequency of the rotor voltage).

In wire 23*a*, the voltage is equal to the rotor voltage, $E_{\text{rotor}}$, times the sine of the rotor angle $\theta$. The voltage in wire 23*b* is equal to $E_{\text{rotor}}$ times the cosine of the rotor angle. The circuit of FIGURE 1 first determines the polarity and then compares the relative magnitudes of $E_{\sin}$ and $E_{\cos}$, to determine the 45° sector (waveform of FIGURE 4) in which the rotor angle lies. This sector information is then recorded in the first three most significant bits in register 25, FIGURE 1. The remaining seven bits in the register 25 represent the location of the rotor angle in the 45° sector determined by the first 3 bits. This angle represented by the last 7 bits we will now call phi ($\phi$). The circuit provides two voltages such that $$(1) \quad E_1=kE \sin \phi$$
$$(2) \quad E_2=kE \cos \phi$$

Where $\phi$ varies from 0° to 45°, and $k$ is an arbitrary constant which takes into account the gain factors of the various components of the circuit of FIGURE 1. The relationships among $E_1$, $E_2$, $\phi$ and $\theta$ for the first quadrant are shown in FIGURE 4b. The $E_1$ voltage is always the smaller and the $E_2$ voltage is the larger of the absolute values of the two voltages $|E_{\sin}|$ and $|E_{\cos}|$. In the first sector $\theta=\phi$, but in the second sector $\theta=90°-\phi$. The relationships in the other quadrants are identical except for additions of multiples of 90° to the equations according to the quadrant the angle is in. For example:

| | 1st sector | 2nd sector |
|---|---|---|
| 2nd quadrant | $\theta=90+\phi$ | $\theta=180-\phi$ |
| 3rd quadrant | $\theta=180+\phi$ | $\theta=270-\phi$ |
| 4th quadrant | $\theta=270+\phi$ | $\theta=360-\phi$ |

Next, a reference voltage is obtained by the circuit 58 of FIGURE 1 from $E_1$ and $E_2$ according to the following equation:

$$(3) \quad E_{\text{ref}}=\sqrt{E_1^2+E_2^2}$$
$$(4) \quad =\sqrt{\overline{kE}^2 \sin_2 \phi+\overline{kE}^2 \cos^2 \phi} \quad \text{(Substitions from Equations 1 and 2)}$$
$$(5) \quad =kE\sqrt{\sin^2 \phi+\cos^2 \phi}$$
$$(6) \quad =kE$$

It is seen then that the $E_{\text{ref}}$ (reference voltage) is proportional to E, the amplitude of the rotor voltage, $E_{\text{rotor}}$.

The next step is to obtain by means of a non-linear digital-to-analog circuit the analog of the sine of N, which is the number in the last 7 bits of register 25. Non-linear digital-to-analog circuitry 64 is provided which performs the following relationship:

$$(7) \quad E_{\text{out}}=E_{\text{ref}} \sin N$$
$$(8) \quad =kE \sin N \quad \text{(Substitution from Equation 6)}$$

Now by utilizing a series of successive approximations the number N is made to assume a value such that $E_{\text{out}}$ is made to equal $E_1$ which gives us the following relationship:

$$(9) \quad E_{\text{out}}=E_1$$

and $$(10) \quad E_{\text{out}}=E_{\text{ref}} \sin N \quad \text{(Equation 7)}$$
$$(11) \quad =kE \sin N \quad \text{(Substitution from Equation 6)}$$

and $$(12) \quad E_1=kE \sin \phi=E_{\text{out}}=kE \sin N \quad \text{(By Equations 1, 9 and 11)}$$

therefore $$(13) \quad kE \sin \phi=kE \sin N$$

and $$(14) \quad \sin \phi=\sin N$$

hence $$(15) \quad \phi=N$$

The number N (which represents $\phi$), together with the three most significant bits in register 25, which define the sector, uniquely define the synchro rotor angle.

Therefore, it has been shown that the circuit of FIGURE 1 will produce a digital number which represents the angular position of the synchro device rotor 21.

Now the FIGURES 1–11 will be considered in more detail to show just exactly how the above relationships are obtained.

In FIGURE 1 it is shown that three synchro voltages 20*a*, 20*b* and 20*c* from the stator of the synchro (FIGURE 3) are applied to the input of transformer 23 (FIGURE 2). The two output voltages 23*a* and 23*b* (FIGURE 4) from transformer 23 are proportional to sine and cosine of the rotor 21 angle and are applied respectively to wave integrators 27 and 28. These wave integrators operate only over a portion of the wave cycle, as shown in FIGURES 5 and 7, and a suitable integrator is shown in the schematic representation of FIGURE 6.

The integrators 27 and 28 operate between 30° and 150° of the cycle as shown in waveform A in FIGURE 5. The integrators are switched on and off by signals from timing boxes 30 and 31 which are synchronized by a signal from phase correction box 32 which receives a 400 cycles per second reference signal. Timing box 31 emits sine waveform B and when this crosses the zero line at point 33 it opens switch 34 in the schematic of FIGURE 6 and closes switch 35. This causes the circuit to integrate as will be understood by those skilled in the art, until the waveform from integrator timing box 30 crosses zero at point 37 as shown by sine waveform C in FIGURE 5. At this point switch 35 opens.

The purpose of the integrators 27 and 28 is to cancel substantially all those voltages which cross the zero mark at 90°, as shown along the axis of waveform A of FIGURE 5. This cancellation will occur since those voltages which cross the zero mark at this point will have as much area above the zero line as below and, when added, the positive areas will be cancelled by the negative areas. Also, this significantly reduces the effects of third harmonics and other harmonics which are the multiple of three and also quadrature voltages which cross the zero mark at the 90° point.

The outputs of the integrators 27 and 28 are directed to quadrant determination comparator 40 where the signals from integrators 27 and 28 are sensed and if both sine and cosine signals are positive then, as may be seen from the waveforms in FIGURE 4, the angle is in the first quadrant, and if the cosine is negative while the sine is positive then the angle is in the second quadrant; if both the sine and cosine are negative then the angle is in the third quadrant and if the cosine is positive when the sine is negative then the angle is in the fourth quadrant. This information is sent by way of a two-line wire to the register 25 and is recorded in the two most significant bits of the register. A circuit performing the functions of the comparator 40 may be found in reference #2.

The outputs of integrators 27 and 28 are also sent respectively to inverters 42 and 43 and also to switches 44 and 45. Inverters 42 and 43 change the sign of the received signal from the integrators 27 and 28 and then send the signal with the changed sign to switches 44, 45 and 46. In this way, switch 44 receives both plus and minus values of the output of integrator 27, and switches 45 and 46 receive both plus and minus values of the output of integrator 28.

The outputs of switches 44 and 45 which are $|E_{sin}|$ and $|E_{cos}|$, respectively, are always a positive value and the output of switch 46, $-|E_{cos}|$, is always a negative value. Switches 44 and 45 are directed to select the positive voltage and switch 46 is directed to select the negative voltage by conversion control 50 which makes a logical decision based upon the state of the two most significant bits of register 25. In other words, by knowing which quadrant the angle is in, the sign of the sine and cosine may be readily determined. The logic of this choice may be derived by reference to FIGURE 4 using techniques well known to those skilled in the art and discussed in reference #3. Switches 44, 45 and 46 are high quality analog switches commonly used in precision analog systems and are described in reference #4.

The outputs of switch 46 and switch 44 are sent to sector comparator 51 which compares the absolute values of $E_{sin}$ and $E_{cos}$ and this determines the sector. How the sector is determined from this information may be seen by examination of the waveforms in FIGURES 4 and 4*a*. For example, in the first sector of the first quadrant the sine of the angle has the smaller absolute value while in the second sector the cosine of the angle has the smaller absolute value. Since $E_{sin}$ represents the sine and $E_{cos}$ represents the cosine, the sector can be determined. The sector information is sent to the third most significant bit of register 25 and is there recorded. The circuit diagram of sector comparator 51 may be found in reference #2.

The output of switches 44 and 45 are fed to both switches 54 and 55 so that the absolute value of $E_{sin}$ and $E_{cos}$ appear at the input of both switches 54 and 55, which are also high quality analog switches. By knowing the quadrant and the sector in which the rotor angle is, the conversion control 50 knows at all times which voltage is larger, $E_{sin}$ or $E_{cos}$, and sends a signal to switches 54 and 55 so that the larger of the two always appears at the output of switch 54 and the smaller of the two always appears at the output of switch 55. The control signals for switches 54 and 55 are supplied by conversion control 50 which makes a logic decision based upon the amplitude relationships in the various sectors as shown in FIGURE 4, and a device capable of doing this is described in reference #3.

The purpose of obtaining the smaller of the two signals $E_{sin}$ and $E_{cos}$ is to provide an analog voltage $E_1$ which is proportional to sin $\phi$ as given by Equation 1. The voltages $E_1$ and $E_2$ are also delivered to a vector magnitude circuit 58 which provides an output related to $E_1$ and $E_2$ as given by Equation 3. (The vector magnitude circuit is described in reference #5.) This output provides a reference voltage, $E_{ref}$, for the non-linear D.A. converter which includes all of the elements in box 64 shown by dashed lines in FIGURE 1. The D.A. converter 64 produces an analog output, $E_{out}$, which is proportional to the sine of the number N in the last 7 bits in register 25. The analog voltage $E_1$ is then compared with the output of $E_{out}$ of the D.A. converter 64 by means of comparator 57 and the comparator 57 output signals are used by the conversion control 50 in a series of successive approximations to cause the last 7 bits of register 25 to assume a digital value corresponding to the angle $\phi$. A description of such a digitizing process can be found in reference #6.

The circuits next to be described are found in the non-linear D.A. converter 64 shown in FIGURE 1. The converter 64 comprises three separate linear D.A. converters 65, 66, and 67 and a decode matrix 60. The digital-to-initial-point converter 66 has 9 bit resolution; the digital-to-slope converter 65 has 6 bit resolution; and the linear converter 67 has 4 bit resolution. A more detailed description of non-linear D.A. converters can be found in reference #7.

The purpose of the decode matrix 60 is to transform the information from the fourth to sixth bit in register 25, to 15 separate lines, 6 lines go to the digital-to-slope converter 65 and 9 lines go to the digital-to-initial-point converter 66 as shown in FIGURE 1. The first stage of decode matrix 60 receives the 3 lines from the fourth to sixth bit of register 25 and through a decode matrix breaks this information down to 8 output lines as shown in FIGURE 8. A circuit for performing this function is shown in reference #8.

The 8 output lines from the first stage 61 are then sent to the second stage 62 which has 6 lines **65*a* which go to the digital-to-slope converter 65 and 9 lines 66*a* which go to the digital-to-initial-point converter 66. This is shown generally in FIGURE 8 and in more detail in FIGURE 9. The 8 input lines 61*a* shown in FIGURE 9 are each connected to the base of a corresponding transistor amplifier and each have a resistor 61*c* which receives a voltage from line 61*d* connected thereto to provide a current flow therein. The transistors are powered by a line 61*e* which is common to each transistor collector and each transistor emitter is connected to a series of diodes in a matrix formation which is readily familiar to one skilled in the art. Currents from lines 61*a* will, as is well understood in the art, selectively energize lines 66*a* and lines 65*a* which are used to control converters 65 and 66 in developing a voltage analog of the sine of the number in the last 7 bits of register 25**.

The output of the non-linear D.A. converter 64 is the sum of two voltages which are as follows: the output of the digital-to-initial-point converter 66, and the output of the linear D.A. converter 67, as shown by curves A, B, and C of FIGURE 10. A first level of voltage for each number in register 25 will be provided by the digital-to-initial-point converter 66 and a second level of voltage will be added to this first level by converter 67. A reference voltage $E_{65}$ for the linear converter 67 is provided by the digital-to-slope converter 65 so that the analog output from the non-linear D.A. converter 64 as a function of the register 25 contents will take the form shown in FIGURE 10. The resulting output forms an approximation to a sine function over the interval 0 to 45 degrees.

The sine function is approximated by eight linear segments as illustrated by FIGURE 10. From a comparison of curves C and D in FIGURE 10 it can be seen that the slope of the function decreases slightly in successive segments as the number in the register 25 is increased. (The slope of D is constant and is drawn to show the change of slope of the various segments of curve C.) This is accomplished in the non-linear D.A. converter 64 by supplying the reference $E_{65}$ for the linear D.A. converter 67 from another linear D.A. converter, the digital-to-slope converter 65, the output of which decreases as the number in bits 4 through 6 increases. The output of the digital-to-slope converter 65 is given by curve E in FIGURE 10.

In FIGURE 10*a* the operation of the non-linear D.A. converter is illustrated in slightly more detail for the first 2 segments. In the first segment the output of the digital-to-initial-point converter 66 is zero and the converter 64 output coincides with the output of the linear D.A. converter 67. As the number in the seventh to tenth bit of register 25 increases from 0 0 0 0 to 1 1 1 1 the converter 67 output increases in 16 steps from 0 to a value corresponding to the sine 5.27° which is the sum of the weights of the last 4 bits in the register 25. (The least significant bit has a weight of $360°/2^{10}$ or 0.35°.) The next larger angle, 5.63° is represented in binary form in the last 5 bits of register 25 by 1 0 0 0 0. For this number the output of the linear D.A. converter 67 is zero, since it receives only the last 4 bits of register 25, but the output of the initial-point converter 65 assumes the value corresponding to sine 5.63°, so that the total non-linear D.A. converter 64 output still has the correct value. For angles between 1 0 0 0 0, and 1 0 0 0 0 0, which lie in the second segment, the initial-point converter 65 provides a voltage component corresponding to sine 5.63° and the linear converter 67 provides another voltage component to bring the sum of the two voltages to a value corresponding to the sine of the angle represented by the number in register 25. Each voltage increment from the linear converter 67 is slightly smaller in the second segment than it was in the first because when the number changed from 1 1 1 1 to 1 0 0 0 0 the output of the slope converter 66 decreased as illustrated by curve E of FIGURE 10. Likewise, for each of the 8 segments shown, the succeeding segment adds a slightly smaller increment.

In the remainder of the segments, the operation of the non-linear D.A. converter 64 is the same except that the magnitude of the voltages are different as illustrated in FIGURE 10.

A simplified schematic of the linear converter 67 is shown in FIGURE 11. The voltage which is formed in the digital-to-slope converter 65 is applied to line 85 to which switches 86, 87, 88 and 89 make contact depending on which of the 4 bits in register 25 have "ones" therein. When switch 89 is closed, a resistance of R is put into the circuit between the reference voltage and the summing amplifier 90; when switch 88 is closed, a resistance of $R/2$ is placed into the circuit to summing amplifier 90; when switch 87 is closed, a resistance of $R/4$ is placed into the circuit to summing amplifier 90 and when switch 86 is closed, a resistance of $R/8$ is placed into the circuit to summing amplifier 90. Summing amplifier 90 then sums the currents of all of the closed switches and the resultant voltage appears in line 91 which is connected to summing device 76, FIGURE 1, where it is added to the output from the digital-to-initial-point converter 66 and which sum is compared to the $E_1$ voltage from switch 55. Further discussion of linear D.A. converters can be found in reference #9.

The non-linear D.A. converter 64, the register 25, the comparator 57, and a portion of the conversion control 50 make up what is known as a successive approximation analog-to-digital converter or encoder, a type of which is described in reference #6. The operation of this circuit is such that the last 7 bits in the register 25, beginning with the most significant of the 7 bits, are successively set to a "1" by the conversion control 50. After each bit is set, the output of the comparator 57 will indicate whether the non-linear D.A. converter 64 output is larger or smaller than the input voltage $E_1$. If the converter 64 output is larger than the input voltage $E_1$, the bit that was just set to a "1" will be reset to a "0," by the conversion control 50. If the converter 64 output is smaller than the input voltage, the bit will be left as a "1," and the next less significant bit is made "1." This trial-and-error process is repeated for each successive bit, and at the end of the conversion the last 7 bits of register 25 will contain a number N which is a digital representation of $\phi$. The successive approximations are made at a rate of 10 $\mu$seconds per bit or less so that the complete analog-to-digital conversion process can be completed in less than one-tenth millisecond.

This angle $\phi$ (or its binary "complement") and the first three bits in the register 25, which were determined by the quadrant and sector determination circuits, define the synchro device rotor angle $\theta$ in digital form. From FIGURE 4*b* it can be seen that in the first sector of any quadrant, the angle $\phi$ is a direct measure of the synchro shaft angle in that quadrant; however, in the second sector, $\phi$ is related to the actual angle $\theta$ by $$\theta = 90° - \phi$$
$$= 45° + (45° - \phi)$$

Therefore, in the second sector, the correct angle is that obtained by subtracting $\phi$ from 90°. However, since the sector comparator 51 already caused a "1" to be placed into the third bit of register 25, which has a weight of 45°, the correct angle is obtained by subtracting $\phi$ from 45°. This subtraction is, in fact, accomplished by performing the binary complement on the last seven bits of register 25 when the conversion is complete. If there is a "1" in the third bit which indicates the angle is in the second sector, then the last seven bits are complemented. The binary complement is obtained by changing "0's" to "1's" and "1's" to "0's" in the binary number.

An example will help to illustrate this point. In FIGURE 4*b* an angle 97 is shown in the second sector, and therefore the third bit shows a "1." Assume that this angle $\theta$ is 80°. The normal conversion sequence, as described previously, produces a number N in the last seven bits of register 25 such that sin $N$=sin $\phi$. Since $\phi$ in the second sector is $90° - \theta$, the number N in the register will be 10°. The contents of the register will appear as illustration A of FIGURE 4*c*. The correct value for the number in the register is 45° minus 10° or 35°. This value is obtained by complementing the last seven bits of the register 25 as shown in illustration B of FIGURE 4*c*.

DIGITAL TO SYNCHRO DEVICES ROTOR POSITION CONVERSION

The second portion of this invention concerns a system for converting a 10 bit digital number to a three-wire A.C. voltage signal for positioning the rotor of a synchro device corresponding to the angle represented by the binary digital number. Generally, the manner in which this is done is as follows. The number in a digital register is converted to an analog of the sine of the number, N, by means of converter circuits similar to those in nonlinear converter 64 of the first portion of this invention. Then the register is complemented and the complemented number is fed through the same converter circuits and the analog of the cosine of N appears at the output. This complementing is carried out at regular intervals.

The sin N and cos N analogs are then fed to two hold circuits; one of which is timed to receive only the sine information and the other of which is timed to receive only the cosine information.

The outputs of the hold circuits are then fed to modulators which change the D.C. signal to an A.C. signal. The outputs of the modulators are then inverted, if necessary, according to the quadrant in which the angle in the digital register occurs so that the phase relationships of the A.C. voltages properly relate to the quadrant in which the angle occurs. The outputs of the modulators are then fed to a transformer wherein the two signals representing sine and cosine are converted to three-wire synchro output which may be accomplished by merely reversing the transformer 23 in FIGURE 1. Now a more detailed description in connection with FIGURES 12–15 will be made.

Angle register 100 is loaded by a computer, not shown, or other means, with a binary digital number having 10 bits therein. The most significant bit, MSB, indicates the half cycle in which the angle is located, and the next most significant bit indicates the quadrant in which the angle is located in the indicated half cycle. The remaining 8 bits indicate the position of the angle in the quadrant.

Lines 100*a* from each of the remaining 8 bits are connected to a non-linear digital-to-analog converter 102 which processes the number in much the same manner as the decode matrix 60, the digital-to-slope converter 65, the digital-to-initial-point converter 66, and the linear-digital-to-analog converter 67 of FIGURE 1 to obtain alternately sin N and cos N. A reference supply 103 supplies the reference voltage which is supplied in the device of FIGURE 1 by the vector magnitude circuit 58.

As mentioned, the output of converter 102 is a D.C. voltage which alternately represents sin N and cos N. The cos N is obtained when the register is complemented by the output conversion control 104 by means of connection 104*a*. Means for complementing a register may be similar to those used for register 25 in FIGURE 1.

The output of converter 102 is fed to each of two sample and hold circuits 105 and 106. These circuits may each take the form of the circuit shown in FIGURE 6.

The output conversion control 104 is connected to each of the circuits 105 and 106 and controls the sampling of these circuits (by closing switches 34 and 35 in FIGURE 6) so that the circuit 105 always receives the sin N voltage and circuit 106 always receives the cos N voltage.

These signals are then sent respectively to modulators 107 and 108 which change the signal from a D.C. analog signal to an A.C. analog signal. Modulators to perform this function are well known to the art and may be found in reference #10.

In order to impart the proper quadrant information to the A.C. analog signal being emitted from modulators 107 and 108, it is necessary to invert the cosine signal in the second and third quadrants and to invert the sine signal in the third and fourth quadrants. The necessity for this may be seen by referring again to the diagram of FIGURE 4. In the first quadrant both signals are positive and no inversion is necessary but in the second quadrant the cosine signal is negative and therefore must be inverted while in the third quadrant both signals are negative and both must be inverted while in the fourth quadrant the sine signal is negative and must be inverted. Details of the proper phase relationship between the two signals in various quadrants are shown in FIGURE 13.

Modulators 107 and 108 have their signals inverted respectively by sign control circuits 109 and 110 which receive instructions from quadrant determinator 112 which in turn receives the quadrant information from the the two most significant bits of register 100. Sign control circuits 109 and 110 perform the inverting function by changing the phase of the reference key for the modulators. The operation of the sign control circuits and quadrant determinator are based upon logic decisions related to the desired phase relationships in the various quadrants as shown in FIGURE 4. A key generator 111 feeds a square wave signal at 400 cycles per second in this embodiment, to sign control circuits 109 and 110.

The outputs from modulators 107 and 108 are amplified by 400 cycle-per-second bandpass amplifiers 114 and 115 respectively and the outputs of amplifiers 114 and 115 are connected to a Scott-connected transformer 116 which is similar to transformer 23 of FIGURE 1 but reversed in position with respect to input and output connections and converts the sine and cosine voltages to a set of three-wire voltages which excite the stator of the synchro device.

The information from a computer, not shown, to the angle register 100 comes periodically, say every tenth of a second. This means that every tenth of a second the number in the register 100 is changed. The rotor angle then would be computed and delivered to the synchro device 120 to turn the rotor therein every tenth of a second and would look like the curve D in FIGURE 14 where time is along the abscissa and each division is a tenth of a second and the rotor angle is along the ordinate.

It is desired to have a smoother curve at the output of the system but to obtain this by changing the output angle register 100 more frequently directly from the computer might overload the computer. In order to get a smoother curve and still only require orders from the computer every tenth of a second, an angle updating circuit comprising a rate register 122 and an adder 124 have been added to the system.

The simplified schematic of FIGURE 15 will be used in explaining the operation of the angle updating circuit. As shown, the rate register 122 has 5 bits with the most significant bit, MSB, indicating whether the correction is to be plus or minus and the remaining bits indicating the amount of the correction to be made in small steps and approximately, in the embodiment shown, ten times more frequently than the orders to the output register 100 from the computer. In this case, since the orders to register 100 from the computer occur approximately every tenth second, the frequency of the output from rate register 122 will occur approximately every one hundredth of a second and will result in the curve E of FIGURE 14.

The rate register 122 also receives its instructions from the computer at a rate of only once every tenth of a second. The contents of the rate register are used to modify the angle register in the direction (sign) and amount indicated every one hundredth of a second. Such registers are well known to the art and may be found in reference #11.

The output of the register 122 is fed to adder 124 which makes a serial addition to the angle register 100 with the quantity indicated in the rate register every time the output conversion control 104 emits a pulse which is coordinated with the input to rate register 122 and occurs every one hundredth of a second. Adder 124 is well known to the art and may be found in reference #12. The times during which the output register 100 is involved in the addition does not cause an interruption in the output of the circuit since the sample and hold circuits 105 and 106, which are also controlled by conversion control 104, are holding at the time of the serial addition to the output register 100 of the quantity in the output rate register 122.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

REFERENCES (1) Blume, L. F., et al., Transformer Engineering, second edition, John Wiley & Sons, Inc., New York, 1951, pp. 234–237.

(2) Fifer, S., Analogue Computation, vol. II, McGraw-Hill Book Company, Inc., New York, 1961, p. 312.

(3) Richards, R. K., Arithmetic Operations in Digital Computers, New York, Van Nostrand, 1955, chapter 3.

(4) Hurley, R. B., Junction Transistor Electronics, John Wiley & Sons, Inc., New York, 1958, pp. 376–382.

(5) Winkler, M. R., "Network Solution of the Right Triangle Problem," IRE Wescon Convention Record, part IV, 1958, p. 123.

(6) Susskind, A. K. (ed.), Notes on Analog-Digital Conversion Techniques, The Technology Press, Massachusetts Institute of Technology, Cambridge, 1957, chapter 5, pp. 54–56.

(7) Schmid, Hermann, "Linear-Segment Hybrid Junction Generators," Proceedings of the Combined Analog Digital Computer Systems Symposium, sponsored by Simulation Councils, Inc. and General Electric Missile and Space Vehicle Department, December 1960, chapter 16.

(8) Ledley, R. S., Digital Computer & Control Engineering, McGraw-Hill Book Company, Inc., New York, 1960, p. 547.

(9) Susskind, A. K., op. cit., pp. 32–35.

(10) Hunter, L. P. (ed.), Handbook of Semiconductor

Electronics, 1st ed., McGraw-Hill Book Company, Inc., New York, 1956, chapter 16, pp. 23–25.
(11) Ibid., chapter 15, pp. 54–56.
(12) Ledley, R. S., op. cit., pp. 491–497.

Having thus described our invention, we claim:

1. Apparatus for conversion between a digital number in a digital register and a synchro device rotor position with said synchro device having synchro stator voltages related to the rotor position comprising
a digital register,
a synchro device having a synchro rotor and synchro stators,
means for obtaining the analog of the digital number,
means for obtaining the analog of a trigonometric function of the synchro rotor angle,
means for establishing a predetermined relationship between the analog of the digital number in the digital register and the analog of the trigonometric function of the synchro rotor angle whereby the digital number in the digital register uniquely defines the synchro rotor angle,
means for comparing the analog of the trigonometric function of the synchro rotor angle with the analog of the digital number in the digital register.

2. Apparatus for conversion between a digital number in a digital register and a synchro device rotor position with said synchro device having synchro stator voltages determined by the rotor position comprising
means for obtaining the analog of a trigonometric function of a digital number in the digital register,
means for comparing the analog of the trigonometric function of the rotor angle with the analog of the trigonometric function of the digital number,
means for making the analog of the digital number equal to the analog of the trigonometric function of the rotor angle,
whereby the digital number defines the synchro rotor position.

3. Apparatus for conversion between a digital number in a digital register and a synchro device rotor position with said synchro device having synchro stator voltages related to the rotor position comprising
a digital register,
a synchro device having a synchro rotor and synchro stator,
means for converting the synchro stator voltages to the analogs of the sine and cosine of the rotor angle,
means for obtaining the analog of the sine of the number in the digital register,
means for comparing the analog of the sine of the number in the digital register with the analog of one of the sine and cosine of the synchro rotor angles,
means for making the analog of the sine of the number in the digital register equal to the analog of one of the sine and cosine of the synchro rotor angle,
whereby the number on the digital register will be equal to the synchro rotor angle.

4. Apparatus for conversion between a digital number in a digital register and the angular position of a rotatable member comprising
a digital register,
a rotatable member,
means for obtaining the analog of the digital number,
means for obtaining the analog of a trigonometric function of the angular position of the rotatable member,
means for comparing the analog of the trigonometric function of the rotatable member angle with the analog of the digital number in the digital register,
means for establishing a predetermined relationship between the analog of the digital number in the digital register and the analog of the trigonometric function of the rotatable member angle whereby the digital number in the digital register uniquely defines the rotatable member angle.

5. The apparatus of claim 3 with
means for providing a voltage from the analogs of the sine and cosine of the rotor angle which is in a predetermined proportion to the amplitude of the synchro rotor excitation voltage,
said proportion being determined by the gain factor of said means for converting the synchro voltages to the analog of the sine and cosine of the rotor angle and the means for obtaining the analog of the sine of the number on the digital register.

6. The apparatus of claim 3 with
means for providing a voltage which is in a predetermined proportion to the amplitude of the synchro rotor excitation voltage,
said proportion being determined by the gain factor of said means for converting the synchro stator voltages to the analogs of the sine and cosine of the synchro rotor angle and the means for obtaining the analog of the sine of the number on the digital register.

7. The apparatus of claim 6 with the means for obtaining the analog of the sine of the number in the digital register comprising three linear converters,
a first linear converter for obtaining a first series of voltage steps of predetermined magnitude corresponding to a first set of predetermined bits in the digital register,
a second linear converter for obtaining a series of voltage steps of smaller magnitude and greater frequency than said first series of voltage steps corresponding to bits in the digital register of lesser significance than said first set of predetermined bits,
a third linear converter for providing a voltage to said second linear converter to adjust the voltage steps of said second linear converter corresponding to the first set of predetermined bits,
means for summing the outputs of said first and second linear converters thereby forming the analog of the sine of the number in the digital register.

8. The apparatus of claim 7 with means for obtaining the positive voltage analogs of the sine and cosine of the synchro rotor angle,
means for determining location of the synchro rotor angle in one of four quadrants by the polarities of the voltage analogs of the sine and cosine of the synchro rotor angle,
means for determining which sector in each of the aforementioned quadrants the synchro rotor angle lies by comparing the relative magnitudes of the analogs of the sine and cosine of the synchro rotor angle,
means for selecting the larger and smaller magnitudes of said positive voltages,
means for sending the smaller of said two positive voltages to said means for comparing the analog of the sine of the number in the digital register with the analog of one of the sine and cosine of the synchro rotor angle,
means for sending both of the larger and smaller voltages to said means for providing a voltage which is in a predetermined proportion to the amplitude of the synchro rotor excitation voltage,
means for complementing a predetermined number of bits in the digital register as determined by said comparison of said positive values of said analog voltages of said sine and cosine of said synchro rotor angle,
so that the means for providing an analog of the number in the digital register operates in a range where the sensitivity is greatest and minimizes the size of said means for obtaining the analog of the sine of the number in the digital register.

9. Apparatus for conversion between a synchro voltage and a resolver voltage comprising
synchro device having a synchro rotor and three synchro stator windings, resolver voltage means having two wires carrying voltages proportional to the position of said synchro rotor, transformer means having connections on one side to each of said synchro stator windings and connections on the other side to said two wires of said resolver voltage means.

10. The apparatus of claim 9 with, means to excite said synchro rotor with a rotor voltage, said synchro stator windings carrying three instantaneous voltages all being related to said rotor voltage and differing in magnitude according to sine functions of the angle of said rotor voltage with the first voltage being proportional to the product of the rotor voltage and the sine of the rotor angle, the second voltage being proportional to the product of the rotor voltage and the sine of the rotor angle plus 60°, and the third voltage being proportional to the product of the rotor voltage plus the sine of the rotor angle plus 120°, said resolver voltage means carrying instantaneous voltages both being related to said rotor voltage and differing in magnitude according to the sine function of the angle of said rotor voltage, with the first volt-being proportional to the product of the rotor voltage and sine of the rotor angle and the second voltage being proportional to the product of the rotor voltage and the sine of the rotor angle plus 90°, said transformer means being a Scott connected transformer.

11. Apparatus for eliminating undesired voltages, including quadrature and third harmonic voltages, from a source voltage containing a desired voltage comprising means for supplying an analog source voltage, integrating means for integrating said analog source, said integrating means being connected to said means for supplying a source voltage, means for obtaining in said integrating means substantially equal areas of undesired analog voltages above and below the zero line in the integrating period to substantially eliminate said undesired voltages.

12. The apparatus of claim 11 where the integrating period is ±60° of one of the 90° and 270° points on the cycle of the desired voltage.

13. Apparatus for conversion between a digital number in a digital register and a synchro device rotor position with the synchro device having synchro stator voltages related to the rotor position comprising means for converting the number in the digital register to a trigonometric function of the number, means for converting said trigonometric function to three wire synchro stator voltages to position the synchro rotor.

14. The apparatus of claim 13 with an angle digital register in which is placed at a given rate the digital number corresponding to the angle to which the synchro rotor is to move, a rate digital register in which is placed at said given rate a digital number corresponding to the direction and magnitude of the next change in the angle digital register, adding means being fed by said rate digital register to add increments to said angle digital register at a rate higher than said given rate, and said increments being equal to the number in said rate digital register.

15. The apparatus of claim 13 with said trigonometric function being the cosine and sine of the number in the digital register.

16. The apparatus of claim 14 with means to periodically complement certain of the bits in the digital register thereby causing the output of said means for converting the number in the digital register to a trigonometric function to change from the analog of the sine of the number in the digital register to the analog of the cosine of the number in the digital register, means to provide the analog of the sine of the number in the digital register and the cosine of the number in the digital register in separate lines.

17. The apparatus of claim 16 with means to modulate and provide an A.C. signal of the analogs of the sine of the number in the digital register and the cosine of the number in the digital register, means to invert the analogs of the sine of the number in the digital register for those quadrants in which the sine appears as a negative quantity and means to invert the analog of the cosine of the number in the digital register for those quadrants in which the cosine appears as a negative quantity.

References Cited by the Examiner

UNITED STATES PATENTS

| | | | |
|---|---|---|---|
| 3,045,230 | 7/1962 | Tripp | 340—347 |
| 3,211,976 | 10/1965 | Brule et al. | 318—28 |

MAYNARD R. WILBUR, *Primary Examiner.*

ROBERT C. BAILEY, *Examiner.*

A. L. NEWMAN, *Assistant Examiner.*